A. GUNDERSEN.
COUNTERSINKING ATTACHMENT FOR AUGER BITS.
APPLICATION FILED MAR. 18, 1920.
1,435,639.
Patented Nov. 14, 1922.
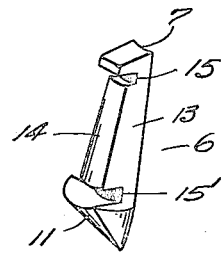
Fig. 5.
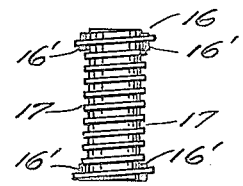
Fig. 4.
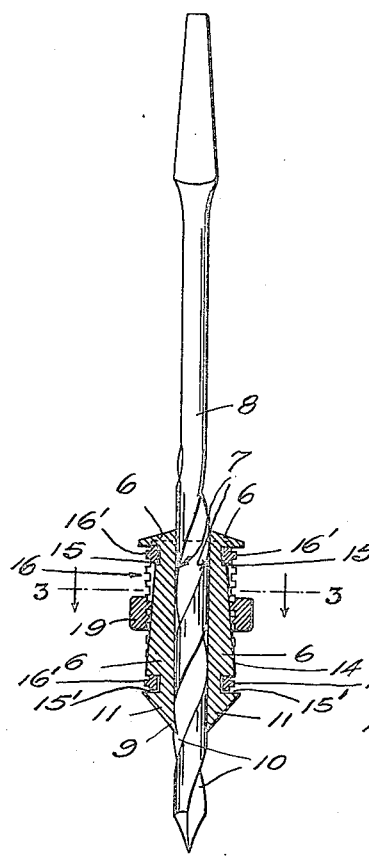
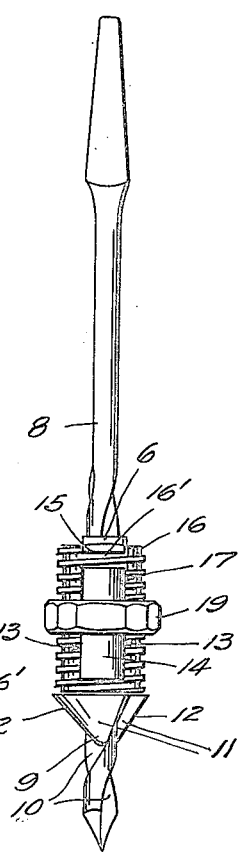
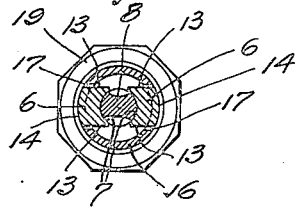
Fig. 3.
Fig. 2.        Fig. 1.
INVENTOR:
Albert Gundersen
BY
Pierre James
ATTORNEY Patented Nov. 14, 1922.

1,435,639

UNITED STATES PATENT OFFICE.

ALBERT GUNDERSEN, OF SEATTLE, WASHINGTON.

COUNTERSINKING ATTACHMENT FOR AUGER BITS.

Application filed March 18, 1920. Serial No. 366,830.

*To all whom it may concern:*

Be it known that I, ALBERT GUNDERSEN, a citizen of the United States, residing at Seattle, in the county of King and State of Washington, have invented certain new and useful Improvements in Countersinking Attachments for Auger Bits, of which the following is a specification.

This invention relates to counter-sinking attachments for boring bits or drills; and its object is the provision of a device of this character which will be of simple and inexpensive construction, efficient and durable in operation and one which may be readily applied to a boring drill.

The invention consists in the novel construction, arrangement and combination of parts as will be hereinafter described and claimed.

In the accompanying drawings, Figure 1 is a front elevational view of a countersinking attachment applied to an auger-bit.

Fig. 2 is a similar view of the same, the attachment being shown in a section taken at right angles to Fig. 1.

Fig. 3 is a horizontal section through 3—3 of Fig. 2.

Fig. 4 is a detached elevational view of the sleeve member.

Fig. 5 is a perspective view of one of the cutting jaws.

In carrying out my invention, I provide two jaw members 6 having concave inner surfaces 7 to seat against the periphery of an ordinary twist drill 8, the lower ends of the jaws being formed, as at 9, to extend into the spiral grooves 10 of the drill. The lower portions 11 of said jaws are of substantially semi-conoidal shapes and are ground or otherwise formed to provide complementary cutting edges 12. Above their cutting portions said jaws are each formed with parallel side surfaces 13.

The outer surfaces 14 of the respective jaws are of arcuate shape in horizontal section and each in angular relation to the respective inner surface 7. 16 represents an exteriorly screw threaded sleeve having at diametrically opposite sides slots 17 to accommodate the beveled portions of the jaws when the peripheral bridge elements 16¹ at their ends fit into the ends of the correspondingly shaped grooves 15 and 15¹ provided in the jaws. 19 represents a nut engaging the thread of sleeve 16 and which upon being screwed downwardly bears against the bevel surfaces 14 of the jaws to force the latter into clamping relations with the drill 8.

The countersinking elements, it is to be noted, are integral with the jaws by which the attachment, as a whole, is clamped to the drill through the instrumentality of the nut operating on a sleeve in which the jaws are held in operative positions.

What I claim is—

1. A counter-sinking attachment for drills, comprising an externally screw threaded tubular member, a pair of drill clamping jaws extending through said member and coupled therewith at both ends of the same against relative axial movements, said jaws being provided with cutting elements at one end of said member, and a nut engaging the threads of said member between the positions whereat the jaws are coupled thereto, said nut serving to effect movements of the jaws radially of said member.

2. A counter-sinking attachment for drills, comprising a screw threaded tubular member having longitudinal slots at diametrically opposite sides, said slots being shorter than said member and arranged to afford bridge elements at opposite ends of the respective slots cutting members having beveled portions extending outwardly through said slots and provided with recesses to receive the respective bridge elements for securing the cutting members to said tubular member with respect to relative axial movements, and a nut engaging the thread of said tubular member and adapted to bear against the beveled portions of said cutting members to effect adjustments of the latter radially of the tubular member.

3. In a counter-sinking attachment for drills, an externally screw-threaded tubular member having a longitudinal slot in its periphery, to afford a circumferentially disposed bridge element at each end of the slot; a jaw member provided with a cutting element and having recesses to receive the respective bridge elements, the portion of said jaw member between said recesses extending through and protruding from said slot, and a nut engaging the threads of said tubular member and serving to effect lateral movements of the jaw member by engaging the protruding portion of the same.

4. A counter sinking attachment for drill comprising a pair of jaw members having cutting edges at one end of each and concave inner surfaces adapted to seat against the circumferential surface of a twist drill, the lower ends of said jaws being formed with portions which protrude inside of the inner periphery, said jaws being provided exteriorly with peripheral grooves, the outer surfaces of said jaws between said grooves being disposed in angular relations with their respective inner surfaces, an exteriorly screw threaded sleeve having at its diametrically opposite sides slots, said slots being of less length than the sleeve and arranged to afford a peripheral bridge element at each end of the sleeve to engage in the respective grooves of the jaws, and a nut engaging the screw threads of said sleeve and against the inclined outer surfaces of the respective jaws.

Signed at Seattle, Washington, this 28th day of February, 1920.

ALBERT GUNDERSEN.

Witnesses:
PIERRE BARNES,
ELIZABETH JOHNSON.